March 27, 1945.  E. M. KRUEGER  2,372,587

SOUND INSULATION FOR FLUID CONDUITS

Filed Oct. 15, 1941

INVENTOR
EMIL M. KRUEGER
BY
Wheeler, Wheeler & Wheeler
ATTORNEYS.

Patented Mar. 27, 1945

2,372,587

UNITED STATES PATENT OFFICE 2,372,587

SOUND INSULATION FOR FLUID CONDUITS

Emil M. Krueger, Milwaukee, Wis., assignor to Badger Meter Manufacturing Company, Milwaukee, Wis., a corporation of Wisconsin Application October 15, 1941, Serial No. 414,998

13 Claims. (Cl. 181—50)

This invention relates to improvements in sound insulation for fluid conduits.

It is the primary object of the invention to provide a novel, simple, and inexpensive sound insulating coupling, easily assembled and adapted to be incorporated in existing, as well as new piping, not only to preclude transmission of sound through the metal of the pipes themselves, but also to damp sound waves in the fluid traversing the piping, preferably without material obstruction to fluid flow. The device may, however, be so constructed as to absorb considerable of the energy of the fluid in the pipe to restrict flow therethrough if desired, this being particularly advantageous in connection with toilet flushing devices not only to damp and absorb the sound of the flushing, but also to reduce the amount of sound at its source by reducing the velocity of the flushing liquid.

Other objects will be apparent to those skilled in the art upon study of the following disclosure of the invention.

In the drawing.

Like parts are identified by the same reference characters throughout the several views.

One of the desired features of the present device is its compactness, the device being so short that it can generally be incorporated in existing lines of pipe. The coupling member 5 has male coupling threads at 6. At 7 it has an annular flange of small radius (use of which is optional), while at 8 it is provided with a second annular flange spaced from flange 7 and of materially increased radius. The flange 8 is preferably provided with a plurality of apertures such as the holes 9, the form of which is immaterial.

Figure 1:
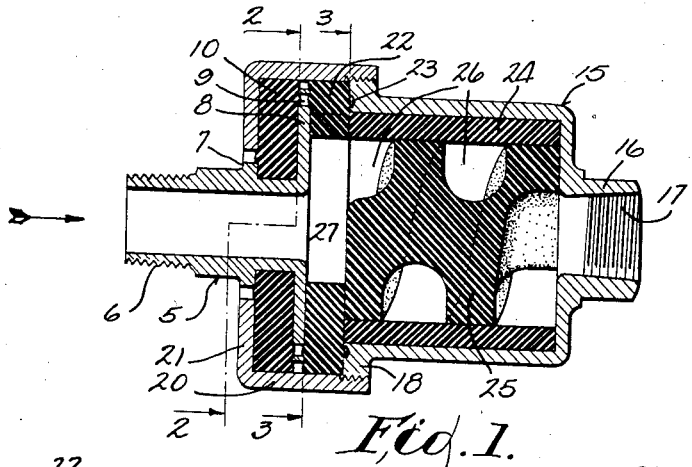
Fig. 1 is a view of a preferred embodiment of the invention as it appears in axial section.
Figure 2:
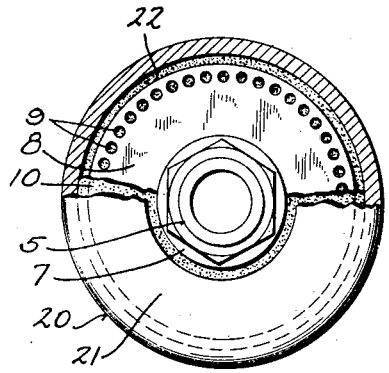
Fig. 2 is a view in transverse section on the line 2—2 of Fig. 1.
Figure 3:
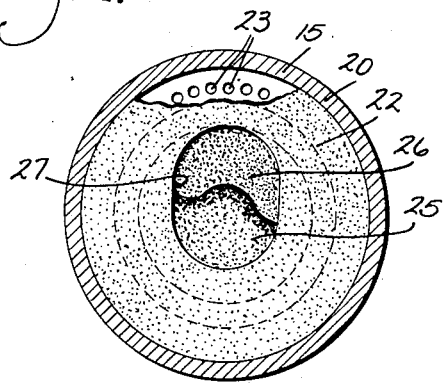
Fig. 3 is a view in transverse section on the line 3—3 of Fig. 1.
Figure 4:
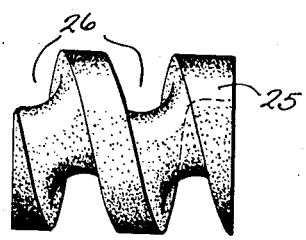
Fig. 4 is a side elevation of the interior partition element of the device.

In the shallow channel between flanges 7 and 8 is a heavy annulus 10 of rubber or other material suitable for sound damping and for packing, said annulus preferably fitted closely at its inner periphery about the coupling member 5 and having such radius that its outer periphery projects beyond the outer periphery of flange 8, as clearly shown in Fig. 1 and Fig. 2. Assuming that the annulus 10 is made of rubber, its resilience will be such that it can be forced over the flange 7 into the position shown.

The coupling member 15 terminates in a sleeve 16 having female coupling threads 17. Coupling member 15 is otherwise cup-shaped and is marginally provided with a radial flange at 18 externally threaded. A ring nut 20 is threaded to the flange 18 of coupling member 15 and includes an inwardly projecting radial annular flange 21, the inner periphery of which is substantially aligned with flange 7 but spaced radially therefrom. It will be understood that the coupling members may have any desired means of connection with other piping or fixtures.

The flange 21 of ring nut 20 engages the outer face of the rubber annulus 10, the periphery of which just fits within the ring nut. Another rubber annulus 22, likewise peripherally fitted within the ring nut 20, is confined between the flange 8 of coupling member 5 and the end face of coupling member 15. The two rubber annuli 10 and 22 are compressed by the tightening of ring nut 20 upon coupling member 15 with the result that the coupling members are resiliently yieldable but nevertheless firmly interconnected through the rubber annuli 10 and 22. The pressure causes the rubber of annuli 10 and 22 to deform somewhat, thereby slightly entering the annular space between flanges 7 and 21, the annular space outside of flange 8 and between such flange and the confining element 20, and the apertures 9 of flange 8. Thus, a sound mechanical joint is provided between coupling members 5 and 15 and one which is hermetically sealed to preclude leakage between these parts. At the same time, due to the use of sound damping material, the transmission of sound waves from a pipe connected with coupling member 5 and a pipe connected with coupling member 15, or vice versa, is negligible. In addition to the function of apertures 9 above described, these serve to reduce the metallic section, thus minimizing sound transmission by interrupting radial propagation of sound through flange 8. For special installations additional rows, or different sizes of holes 9 may be provided.

If desired, the end face of coupling member 15 may be socketed at 23 to provide further keys with which the deformed rubber annulus 22 will be engaged under compression.

The interior of coupling member 15 is lined with a heavy sound damping sleeve at 24 which abuts the end of the coupling member and also abuts the face of annulus 22. Within this sleeve is a helical core or partition element 25 likewise preferably made of rubber or the like, and providing a fully open helical groove at 26 which provides free and unobstructed communication through the device. Assuming the flow to be in the direction indicated by the arrow in Fig. 1, fluid will enter coupling member 5 axially and will pass through the central opening 27 of annulus 22 into the helical channel 26, the outlet portion of which registers with the discharge coupling sleeve 16 of coupling member 15.

The fact that the channel 26 is formed helically in an otherwise solid body 25, and is encased or enclosed in the encircling sound damping sleeve 24, makes it in many respects the equivalent of a tightly wound helix of hose of sound damping material, but inasmuch as the body 25 is preformed and solid and may, without leakage, be loosely fitted into the sleeve 24, the structure as illustrated has many advantages which a tightly wound elastic hose would not have, it being difficult to wind rubber hose of equal weight into as close and compact a helix as that illustrated.

While the parts 10, 22, 24 and 25 have been described as being made of rubber, it will, of course, be apparent to those skilled in the art that not only the well known rubber substitutes (such as "Duprene," "Neoprene," "Thiacol"), but also other sound damping or sound absorbing materials, may be used. Rubber, or rubber substitutes, are preferable because of their availability and yieldability and high sound suppressing qualities and because they are water and corrosion proof and oil-resistant and non-electrolytic. However, I contemplate that even metallic bodies of soft or porous or cellular metal and also plastic, ceramic and fibrous and other materials, both metallic and non-metallic, organic and non-organic, may be used to achieve many of the objectives here sought, to the extent that the materials used are capable of the functions herein described.

The number of angular turns of the helical conduit 25 may vary according to requirements. For average use I have found that sixty percent of one turn is adequate. For use in other installations the device as illustrated, will substantially completely eliminate all sound transmission not only through the metal of the pipe but also through the liquid or other fluid traversing the pipe. For use in a pipe leading to a toilet flush tank or direct toilet flush valve, it is possible not only to increase the sound absorbing effect but also to diminish the energy of the water passing through the device by increasing the number of turns or decreasing the cross section of the passage, or both, to secure the desired effect.

In any event, the fluid traversing the helical conduit is completely surrounded by heavy masses of sound damping material, and it has been discovered that the helical form of the conduit is not only productive of an extremely compact structure but is also peculiarly effective for sound damping purposes. It is particularly to be noted that, like a hose, the helical conduit in which sound damping is effected, is substantially smooth walled and has a cross section substantially equal to that of the inlet portion of the device so that, aside from such energy as is lost due to change in direction, flow is wholly unimpeded through the device. As the fluid changes direction in pursuing its helical path, the sound waves, tending to continue without change of direction, encounter walled surfaces which, due to the material employed, are not sound reflecting but tend to absorb and damp (or suppress) the waves. As above noted, there are no abrupt changes of direction and nothing to create any seriously obstructive eddy currents.

While it is greatly preferred that the conduit for the fluid should be helical rather than spiral, this, for most purposes, giving a more compact structure, I nevertheless recognize that the conduit disposed spirally in a single plane would achieve many of the objects of this invention, and accordingly I call the conduit of my device a convoluted conduit to include generically either a helical or spiral form.

Those skilled in the art will appreciate the fact that the component parts are of such a nature as to be easily formed and easily assembled and disassembled. Moreover, at least to the extent of the member 22, some of the same material used for damping sound transmitted through the fluid is also used to damp sound which would otherwise be carried between the metal parts of the device.

I claim:

1. A sound deadening device for interposition in a pipe line to prevent the transmission of sound waves through the line and through the fluid in the line, said device comprising casing means of larger cross-sectional area than the line defining an internal chamber, inlet and outlet connections communicating with the chamber for connection to the line, the casing means including sound damping material interposed between the inlet and outlet connections to prevent the transmission of sound waves in the pipe line through the casing means, a lining of sound damping material in the chamber, and a body of sound damping material in the chamber in contact with the lining and having its lining-contacting surface shaped to form, in cooperation with the lining, a convoluted conduit in the chamber communicating with the inlet and outlet connections, whereby the direction of flow of the fluid through the conduit is changed and sound waves in the fluid are absorbed by engagement with the sound damping material.

2. A sound deadening device for interposition in a pipe line to prevent the transmission of sound waves through the line and through the fluid in the line, said device comprising a casing having at one end a line coupling of a size materially smaller than the casing, and having at its other end an aperture, a second line coupling extending through the aperture in spaced relation to the casing and provided with a radial flange, said casing including a sound damping lining having portions oppositely engaging said flange whereby to provide a seal and a non-metallic connection between the second coupling and the casing, and a body of sound damping material within the casing having a convoluted channel communicating with the respective couplings, said body being engaged with said lining and providing a convoluted conduit affording communication through the casing between said couplings, whereby the direction of flow of fluid through the conduit is changed and sound waves in fluid passing between said couplings are absorbed in the sound damping material.

3. A sound deadening device for interposition in a pipe line to prevent the transmission of sound waves through the line and through the fluid in the line, said device comprising a casing of larger cross-sectional area than the line including a cup-shaped portion having a line coupling at its end and a ring nut in threaded engagement with said cup-shaped portion, a second line coupling extending through the ring nut and provided within the casing with an annular flange, sound damping means within the casing including a lining sleeve within the cup-shaped portion of the casing, and sound damping means within the ring nut between which said flange is clampingly engaged, whereby to provide packing and a non-metallic connection between the second coupling and the casing, and a body of sound damping material within the cup-shaped portion of the casing in contact with the lining sleeve and having its lining-contacting surface shaped to form, in cooperation with the lining, a convoluted conduit in the casing communicating with the respective couplings whereby the direction of flow through such conduit is changed and sound waves in the fluid traversing the conduit are absorbed by engagement with the sound damping material.

4. The combination with inlet and outlet coupling elements, one of said elements comprising a chamber and the other of said elements having a flange in spaced relation to the chamber, an annular sound-damping packing disposed between the flange and the end of the chamber, a second annular sound-damping packing at the opposite side of the flange, a confining member connected with the chamber and extending about the flange and engaged with said second packing under compression, and sound-damping means within the chamber providing a continuous and substantially unobstructed passage between the inlet and outlet of said coupling elements.

5. The structure of claim 4 in which said passage providing means constitutes a non-metallic sleeve lining the chamber and a convoluted partition coacting with said sleeve to define a convoluted conduit.

6. The device of claim 4 in which said sound-damping means comprises a sleeve of rubber material lining said chamber and abutting said first packing, and a helical partition of rubber material providing, with said sleeve, a helical passage through said chamber.

7. A device of the character described, comprising coupling members having aligned inlet and outlet ports, one of said members comprising a chamber constituting an enlargement of said port, a sleeve of sound-damping material interiorly fitted as a lining to said chamber and substantially corresponding in length thereto, a generally helical partition of sound-damping material within said lining and coacting therewith to define a helical conduit, said partition being formed to lead said conduit to said axial port, a generally annular sound-damping packing abutting the end of said chamber and sleeve and partition, the other of said coupling members having a flange engaging said packing, a second sound-damping packing engaging the opposite side of said flange, and a confining element embracing said second packing and connected under tension with said first mentioned member about said flange and the first and second packing, said first packing having a central aperture affording communication between the port of the second member and said conduit.

8. The device of claim 7 in which the packing is compressible and said flange has means in which said packing is engaged under compression to key said packing and flange against relative rotation.

9. The device of claim 7 in which the packing is compressible and the respective coupling members each are provided with means in which the packing first mentioned is engaged under compression as a means of keying said members against relative movement other than such as is accommodated by the yielding of said first packing.

10. A sound trap comprising coupling members, at least one of which includes a coupling nipple of metallic sound transmitting material and which is provided with a flange of like material having in said material a series of openings so reducing the cross section of the material for sound transmission as to reduce its conductivity of sound between its ends.

11. A sound trap comprising a coupling member of sound transmitting material including a coupling nipple and a radial flange provided with an annular series of holes spaced inwardly from its periphery and extending substantially completely about the flange, said holes being closely spaced and adapted to intercept the radial transmission of sound waves through said flange.

12. A sound trap comprising a pair of coupling members of material normally sound conductive, one of said members having a radial flange and the other of said members comprising shoulders adjustably spaced therefrom, packing and sound-damping means confined under compression between the flange and the respective shoulders, said flange being provided within its periphery with a substantially complete annular series of openings closely spaced, whereby to reduce the section of said flange available for radial propagation of sound waves through said flange.

13. The device of claim 12 including, in combination, conduit means of convolute form disposed within said other coupling member in the path of fluid communication through said members, said conduit means comprising a wall of sound-suppressing material defining a substantially unobstructed fluid passage of approximately uniform cross section.

EMIL M. KRUEGER.